United States Patent
Chien et al.

(10) Patent No.: US 10,394,043 B2
(45) Date of Patent: Aug. 27, 2019

(54) METHOD OF ADJUSTING A PLURALITY OF OPTICAL ELEMENTS ASSOCIATED WITH A ROS

(75) Inventors: Alice Chien, Pittsford, NY (US); Robert Paul Herloski, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 592 days.

(21) Appl. No.: 12/972,919

(22) Filed: Dec. 20, 2010

(65) Prior Publication Data
US 2012/0158368 A1  Jun. 21, 2012

(51) Int. Cl.
| | | |
|---|---|---|
| G03G 15/043 | (2006.01) |
| G02B 27/62 | (2006.01) |
| G02B 26/12 | (2006.01) |
| G03G 15/00 | (2006.01) |
| G02B 7/00 | (2006.01) |
| B41J 2/47 | (2006.01) |

(52) U.S. Cl.
CPC .............. *G02B 27/62* (2013.01); *B41J 2/471* (2013.01); *G02B 26/12* (2013.01); *G03G 15/043* (2013.01); *G03G 15/50* (2013.01); *G02B 7/003* (2013.01)

(58) Field of Classification Search
None
See application file for complete search history.

(56) References Cited

U.S. PATENT DOCUMENTS

| 5,371,526 A * | 12/1994 | Appel et al. ................... 347/239 |
| 7,623,281 B2 * | 11/2009 | Ichihashi et al. .......... 359/205.1 |
| 2003/0132372 A1 * | 7/2003 | Lofthus et al. ............... 250/234 |
| 2005/0078166 A1 * | 4/2005 | Okugawa ................. B41J 2/471 347/152 |
| 2006/0115284 A1 * | 6/2006 | Grace et al. .................... 399/49 |
| 2007/0019178 A1 * | 1/2007 | Byers ..................... G03B 27/72 355/69 |
| 2008/0165430 A1 * | 7/2008 | Bareau ............... G02B 13/0035 359/690 |
| 2009/0108172 A1 * | 4/2009 | Bradley .................... G01J 9/00 250/201.9 |
| 2010/0321803 A1 * | 12/2010 | Nawata .................. G02B 7/005 359/822 |

OTHER PUBLICATIONS

Code V, Introductory User's Guide, Optical Research Associates, Pasadena, CA 91107, May 2008, 284 Pages.

* cited by examiner

*Primary Examiner* — Hugh M Jones
*Assistant Examiner* — Bernard E Cothran
(74) *Attorney, Agent, or Firm* — Fay Sharpe LLP

(57) ABSTRACT

Disclosed is a method of adjusting a plurality of optical elements associated with a printing system ROS. According to one exemplary embodiment, sensitivity analysis is performed on a computer model of the ROS system and an optical element alignment sequence is generated to minimize the number of optical element adjustments needed to achieve a predefined ROS performance.

18 Claims, 2 Drawing Sheets

METHOD OF ADJUSTING A PLURALITY OF OPTICAL ELEMENTS ASSOCIATED WITH A ROS

BACKGROUND

The present disclosure is directed to a printing system ROS to form images on a photoreceptor surface. More particularly, the present disclosure is directed to a compensation process associated with an optical system associated with the ROS.

In many optical systems associated with printing ROS, there are numerous manufacturing tolerances that must be accommodated for in the final design. For example, a typical ROS includes 150+ different tolerances associated with a plurality of optical elements and 60+ performance metrics.

This disclosure provides a method of adjusting a plurality of optical elements associated with a printing system ROS as a compensation strategy. This disclosure also provides an adjustment process where the number of adjustors is minimized.

INCORPORATION BY REFERENCE

"CODE V" Introductory User's Guide by Optical Research Associates, Pasadena, Calif., copyright May 2008, 284 pages.

BRIEF DESCRIPTION

In one embodiment of this disclosure, described is a method of adjusting a plurality of optical elements associated with a printing system ROS associated with a photoreceptor comprising a) creating a computer model of the printing system ROS, the computer model including a plurality of input parameters associated with the optical and mechanical tolerances of the optical elements, and a plurality of output parameters associated with the performance of a beam associated with the printing system ROS; b) performing a sensitivity analysis of the computer model to determine an effect of the plurality of input parameters on each respective output parameter; c) performing a Monte Carlo simulation of the printing system ROS using the computer model to determine an alignment sequence of optical elements associated with selected input parameters to optimize the plurality of output parameters associated with the performance of the printing system ROS, wherein the selected input parameters are selected as a function of maximum output parameter effect and one or more other constraints associated with the printing system ROS; and d) aligning the optical elements according to the alignment sequence to optimize the plurality of output parameters associated with the printing system ROS.

In another embodiment of this disclosure, described is a computer readable program product, storing instructions that when executed by a computer, causes the computer to execute the instructions to perform a method of adjusting a plurality of optical elements associated with a printing system ROS associated with a photoreceptor, the method comprising a) creating a computer model of the printing system ROS, the computer model including a plurality of input parameters associated with the optical and mechanical tolerances of the optical elements, and a plurality of output parameters associated with the performance of a beam associated with the printing system ROS; b) performing a sensitivity analysis of the computer model to determine an effect of the plurality of input parameters on each respective output parameter, c) performing a Monte Carlo simulation of the printing system ROS using the computer model to determine an alignment sequence of optical elements associated with selected input parameters to optimize the plurality of output parameters associated with the performance of the printing system ROS, wherein the selected input parameters are selected as a function of maximum output parameter effect and one or more other constraints associated with the printing system ROS; and d) aligning optical elements according to the alignment sequence to optimize the plurality of output parameters associated with the printing system ROS.

DETAILED DESCRIPTION

This disclosure provides an optimal compensation strategy for a ROS based image marking system. In any optical system there are numerous manufacturing tolerances that must be accommodated in any final design. For a typical ROS, there are 150+ different tolerances, and 60+ performance metrics. Via Monte Carlo simulation, a set of tolerances need to be developed which are capable of being met by a supplier, and a set of adjustments (with finite precision), such that all performance metrics are met at a specified Cpk level (e.g., 1.33). There are tradeoffs between the magnitude of the tolerances, the number and adjustability of the compensators, and the performance metric spec levels. Note that the compensation strategy development procedure is widely applicable to many different ROS systems, but will be described with reference to five particular compensators specific to an exemplary ROS with performance metric specs as described below. Note that minimization of adjusters reduces UMC and alignment labor costs.

There are 150+ optical/mechanical errors (tolerances) and 65 well-defined output parameters with expected performance limits associated with the exemplary VCSEL ROS system described heretofore. The system is composed of 19 optical components, 14 of which are available for actuation. Each component has six positional degree of freedoms, i.e. translation and tilt in three dimensions, as well as many other constructional and optical degrees of freedom (such as index of refraction, x and y radii of curvature, thickness). This disclosure provides a VCSEL ROS system with a minimum number of adjustors while maintaining the Cpk of the output parameters above 1.33.

A VCSEL ROS system with a minimum number of adjustors is disclosed. A minimum number of 5 adjustors are needed to maintain the Cpk of all 65 output parameters above 1.33. Major contributors for each output parameters are identified using the sensitivity analysis tool provided by CODE V. As a compensation strategy, one can reduce the amount of variation in one or more contributors and/or use designated adjustors to reduce the variation in the outputs. The adjustor is selected by the amount of impact it incurs on the output and the availability in the mechanical design. A system model is created in CODE V and the latitude of the system is investigated with Monte Carlo simulations.

Figure 1:
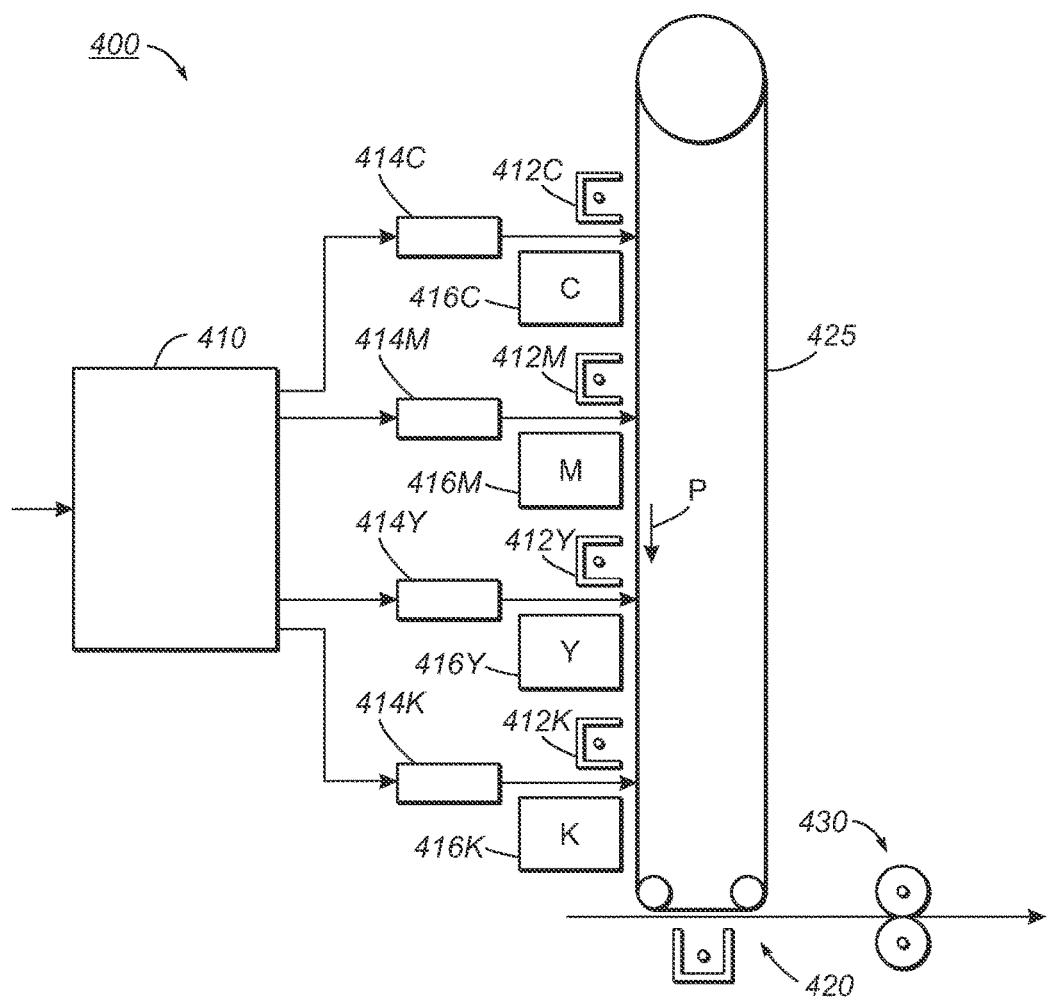
FIG. 1 shows an exemplary printing apparatus according to this disclosure.

With reference to FIG. 1, a VCSEL ROS system with a minimum number of 5 adjustors is shown. Each component in FIG. 1 has optical tolerances (fringe, thickness, refractive index, surface offset, and wedge), as well as mechanical tolerances (X-, Y-, Z-translations and tilts). Table 1, below, shows a sample of the tolerance types and values for Lens 2. Table 2 shows one exemplary example of a complete list of optical element tolerances associated with a VCSEL ROS system. The tolerances are modeled as Gaussian-distributed with tolerance value at 2-sigma. The output parameters are bows, differential bows, lead edge registrations, skew, lateral registrations, swath magnifications, fast scan magnifications, scan nonlinearity, wobble, beam spacing, beam sizes, and spot sizes, along with output parameters and their tolerances. Table 3, below, shows a sample of output parameters and their tolerances. Table 4 shows a complete list of output parameters associated with a VCSEL ROS according to an exemplary embodiment of this disclosure.

TABLE 1

Optical and mechanical tolerances for Lens 2

| Element | Parameter | Nominal units | Nominal value | Tolerance units | OM Tolerance value (+/− 2 sigma) |
|---|---|---|---|---|---|
| Lens 2 | R1 CONCAVE XSCAN-CYLINDER | mm | 21.445751 | fr/X fr/Y | 2.00 |
| (bracket mounted) | R2 PLANO | mm | Infinity | fr/X fr/Y | 2.00 |
| Clear Aperture: | CENTER THICKNESS | mm | 5.0 mm | mm | 0.10 |
| 12.0 mm X-DIAMETER | REFRACTIVE INDEX | | 1.51118 | | 0.00 |
| 12.5 mm Y-DIAMETER | WEDGE | mm | 0 | mm TIR | 0.03 |
| | X-POSITION ERROR | mm | 0 | mm | 0.05 |
| | Y-POSITION ERROR | mm | 0 | mm | 0.05 |
| | Z-POSITION (AXIAL POSITION) ERROR | mm | 0 | mm | 0.05 |
| | X-TILT ERROR | deg. | 0 | deg. | 0.17 |
| | Y-TILT ERROR | deg. | 0 | deg. | 0.07 |
| | Z-TILT (AXIAL ROTATION) ERROR | deg. | 0 | deg. | 0.05 |

TABLE 2

| | Inputs |
|---|---|
| VCSEL ARRAY | X-POSITION ERROR |
| | Y-POSITION ERROR |
| | Z-POSITION (AXIAL POSITION) ERROR |
| | X-TILT ERROR |
| | Y-TILT ERROR |
| | Z-TILT (AXIAL ROTATION) ERROR |
| VCSEL WINDOW | R1 PLANO |
| | R2 PLANO |
| | REFRACTIVE INDEX |
| | WEDGE |
| | CENTER THICKNESS |
| | X-POSITION ERROR |
| | Y-POSITION ERROR |
| | Z-POSITION (AXIAL POSITION) ERROR |
| | X-TILT ERROR |
| | Y-TILT ERROR |
| COL | R1 SPHERE |
| | R2 ASPHERE |
| | CENTER THICKNESS |
| | REFRACTIVE INDEX |
| | WEDGE |
| | X-POSITION ERROR |
| | Y-POSITION ERROR |
| | Z-POSITION ERROR |
| APERTURE | R1 PLANO |
| | X-POSITION ERROR |

TABLE 2-continued

| | Inputs |
|---|---|
| | Y-POSITION ERROR |
| | Z-POSITION (AXIAL POSITION) ERROR |
| | X-TILT ERROR |
| | Y-TILT ERROR |
| | Z-TILT (AXIAL ROTATION) ERROR |
| BEAM SPLITTER | R1 PLANO |
| | R2 PLANO |
| | REFLECTION |
| | TRANSMISSION |
| | CENTER THICKNESS |
| | REFRACTIVE INDEX |
| | WEDGE |
| | X-TILT ERROR |
| | Y-TILT ERROR |
| L1 | R1 CONCAVE XSCAN-CYLINDER |
| | R2 PLANO |
| | CENTER THICKNESS |
| | REFRACTIVE INDEX |
| | WEDGE |
| | X-DECENTER |
| | X-POSITION ERROR |
| | Y-POSITION ERROR |
| | Z-POSITION (AXIAL POSITION) ERROR |
| | X-TILT ERROR(Alpha Tilt BTY) |
| | Y-TILT ERROR(Beta Tilt BTX) |
| | Z-TILT (AXIAL ROTATION) ERROR |
| M1 (casting mounted) | R1 PLANO |
| | Z-POSITION (AXIAL POSITION) ERROR |
| | X-TILT ERROR |
| | Y-TILT ERROR |
| L2 | R1 CONVEX SPHERE |
| | R2 PLANO |
| | CENTER THICKNESS |
| | REFRACTIVE INDEX |
| | WEDGE |
| | X-DECENTER |
| | Y-DECENTER |
| | X-POSITION ERROR |
| | Y-POSITION ERROR |
| | Z-POSITION ERROR |
| | X-TILT ERROR |
| | Y-TILT ERROR |
| | Z-TILT (AXIAL ROTATION) ERROR |
| M2 (casting mounted) | R1 PLANO |
| | Z-POSITION (AXIAL POSITION) ERROR |
| | X-TILT ERROR |
| | Y-TILT ERROR |
| L3 | R1 PLANO |
| | R2 CONVEX SCAN-CYLINDER |
| | CENTER THICKNESS |
| | REFRACTIVE INDEX |
| | WEDGE |
| | Y-DECENTER |
| | X-POSITION ERROR |
| | Y-POSITION ERROR |
| | Z-POSITION (AXIAL POSITION) ERROR |
| | X-TILT ERROR |
| | Y-TILT ERROR |
| | Z-TILT (AXIAL ROTATION) ERROR |
| L4 | R1 PLANO |
| | R2 CONCAVE XSCAN-CYLINDER |
| | CENTER THICKNESS |
| | REFRACTIVE INDEX |
| | WEDGE |
| | X-DECENTER |
| | X-POSITION ERROR |
| | Y-POSITION ERROR |
| | Z-POSITION ERROR |
| | X-TILT ERROR |
| | Y-TILT ERROR |
| | Z-TILT (AXIAL ROTATION) ERROR |
| POLYGON (casting mounted) | R1 PLANO |
| | X-POSITION ERROR |
| | Y-POSITION ERROR |
| | Z-POSITION (AXIAL POSITION) ERROR |
| | X-TILT ERROR |
| | Y-TILT ERROR |

TABLE 2-continued

| | Inputs |
|---|---|
| SL1 | Z-TILT (AXIAL ROTATION) ERROR<br>R1 CONCAVE Y-CYLINDER<br>R2 PLANO<br>CENTER THICKNESS<br>REFRACTIVE INDEX<br>WEDGE<br>Y-DECENTER<br>X-POSITION ERROR<br>Y-POSITION ERROR<br>Z-POSITION ERROR<br>X-TILT ERROR<br>Y-TILT ERROR<br>Z-TILT (AXIAL ROTATION) ERROR |
| SL2 | R1 PLANO<br>R2 CONVEX Y-CYLINDER<br>CENTER THICKNESS<br>REFRACTIVE INDEX<br>WEDGE<br>Y-DECENTER<br>X-POSITION ERROR<br>Y-POSITION ERROR<br>Z-POSITION ERROR<br>X-TILT ERROR<br>Y-TILT ERROR<br>Z-TILT (AXIAL ROTATION) ERROR |
| M3 | R1 CONCAVE X-CYLINDER<br>X-POSITION ERROR TOTAL RSS<br>X-POSITION ERROR OPTICS<br>X-POSITION ERROR CASTING<br>Y-POSITION ERROR CASTING<br>Z-POSITION ERROR CASTING<br>X-TILT ERROR<br>Y-TILT ERROR<br>Z-TILT (AXIAL ROTATION) ERROR |
| M4 | R1 CONVEX X-CYLINDER<br>X-POSITION ERROR TOTAL RSS<br>X-POSITION ERROR OPTICS<br>X-POSITION ERROR CASTING<br>Y-POSITION ERROR CASTING<br>Z-POSITION ERROR CASTING<br>X-TILT ERROR<br>Y-TILT ERROR<br>Z-TILT (AXIAL ROTATION) ERROR |
| M5 | R1 PLANO<br>X-POSITION ERROR<br>Y-POSITION ERROR<br>Z-POSITION ERROR<br>X-TILT ERROR<br>Y-TILT ERROR<br>Z-TILT (AXIAL ROTATION) ERROR |
| SOS PO Mirror | R1 PLANO<br>Z-POSITION (AXIAL POSITION) ERROR<br>X-TILT ERROR<br>Y-TILT ERROR<br>Z-TILT (AXIAL ROTATION) ERROR |
| SOS Lens | R1 CONVEX SCAN-CYLINDER<br>R2 PLANO<br>CENTER THICKNESS<br>REFRACTIVE INDEX<br>WEDGE<br>X-POSITION ERROR<br>Y-POSITION ERROR<br>Z-POSITION (AXIAL POSITION) ERROR<br>X-TILT ERROR<br>Y-TILT ERROR<br>Z-TILT (AXIAL ROTATION) ERROR |
| SOS Detector | R1 PLANO<br>X-POSITION ERROR<br>Y-POSITION ERROR<br>Z-POSITION (AXIAL POSITION) ERROR<br>X-TILT ERROR<br>Y-TILT ERROR<br>Z-TILT (AXIAL ROTATION) ERROR |
| M6 | R1 CONCAVE X-CYLINDER<br>X-POSITION ERROR TOTAL RSS<br>X-POSITION ERROR OPTICS<br>X-POSITION ERROR CASTING<br>Y-POSITION ERROR CASTING<br>Z-POSITION ERROR CASTING<br>X-TILT ERROR<br>Y-TILT ERROR<br>Z-TILT (AXIAL ROTATION) ERROR |
| OUTPUT WINDOW | R1 PLANO<br>R2 PLANO<br>CENTER THICKNESS<br>REFRACTIVE INDEX<br>WEDGE<br>X-POSITION ERROR<br>Y-POSITION ERROR<br>Z-POSITION (AXIAL POSITION) ERROR<br>X-TILT ERROR<br>Y-TILT ERROR |
| IMAGE PLANE | R1 PLANO<br>Z-POSITION (AXIAL POSITION) ERROR<br>X-TILT ERROR<br>Y-TILT ERROR |

TABLE 3 output parameters and their specs

| Metric Name | Unit | Nominal | Tolerance |
|---|---|---|---|
| Bow at Beam 1 | μm | 0 | 30 |
| Bow at Beam 32 | μm | 0 | 30 |
| Bow at Beam (0,0) | μm | 0 | 30 |
| Differential Bow | μm | 0 | 3 |
| Lead Edge Registration | μm | 0 | 2300 |
| Skew | mrad | 0 | 0.67 |
| Lateral Registration at Beam 1 | mm | 0 | 2 |
| Lateral Registration at Beam 32 | mm | 0 | 2 |
| Lateral Registration at Beam (0,0) | mm | 0 | 2 |
| Swath Magnification SOA | μm | 296.26 | 3 |
| Swath Magnification EOA | μm | 296.26 | 3 |
| Swath Magnification COA | μm | 296.26 | 3 |
| Fast Scan Magnification at Beam 1 | % | 100 | 0.3 |
| Fast Scan Magnification at Beam 32 | % | 100 | 0.3 |
| Maximum Scan Nonlinearity at Beam (0,0) | μm | 0 | 350 |
| Wobble SOA | μm | 0 | 0.6 |
| Wobble EOA | μm | 0 | 0.6 |
| Wobble COA | μm | 0 | 0.6 |
| Average Beam Spacing | μm | 10.58 | 1.25 |
| FWHM X Spot Size | μm | 27.9402 | 6 |
| FWHM X Spot Size Uniformity | μm | 0 | 6 |
| FWHM Y Spot Size | μm | 33.6364 | 6 |
| FWHM Y Spot Size Uniformity | μm | 0 | 6 |

TABLE 4

OUTPUTS

Bow at beam 1
Bow at beam 32
Bow at beam (0,0)
Differential bow
Lead edge registration
Skew
Lateral Registration at beam 1
Lateral Registration at beam 32
Lateral Registration at beam (0,0)
Swath magnification at Start of Scan
Swath magnification at End of Scan
Swath magnification at Center of Scan
Fast scan magnification at beam 1
Fast scan magnification at beam 32
Scan
Nonlinearity
Wobble at Start of Scan
Wobble at End of Scan
Wobble at Center of Scan
Average beam spacing TABLE 4-continued

OUTPUTS

| | |
|---|---|
| FWHM X spot size | |
| FWHM X spot size uniformity | |
| FWHM Y spot size | |
| FWHM Y spot size uniformity | |
| X Beam size at | Window |
| X Beam size at | Collimator |
| X Beam size at | Stop |
| X Beam size at | CBS |
| X Beam size at | L1 |
| X Beam size at | M1 |
| X Beam size at | L2 |
| X Beam size at | M2 |
| X Beam size at | L3 |
| X Beam size at | L4 |
| X Beam size at | Polygon |
| X Beam size at | SL-1 |
| X Beam size at | SL-2 |
| X Beam size at | M3 |
| X Beam size at | M4 |
| X Beam size at | M5 |
| X Beam size at | M6 |
| X Beam size at | Output Window |
| X Beam size at | Image Plane |
| X Beam size at | SOS Pickoff Mirror |
| X Beam size at | SOS Lens |
| X Beam size at | SOS Detector |
| Y Beam size at | Window |
| Y Beam size at | Collimator |
| Y Beam size at | Stop |
| Y Beam size at | CBS |
| Y Beam size at | L1 |
| Y Beam size at | M1 |
| Y Beam size at | L2 |
| Y Beam size at | M2 |
| Y Beam size at | L3 |
| Y Beam size at | L4 |
| Y Beam size at | Polygon |
| Y Beam size at | SL-1 |
| Y Beam size at | SL-2 |
| Y Beam size at | M3 |
| Y Beam size at | M4 |
| Y Beam size at | M5 |
| Y Beam size at | M6 |
| Y Beam size at | Output Window |
| Y Beam size at | Image Plane |
| Y Beam size at | SOS Pickoff Mirror |
| Y Beam size at | SOS Lens |
| Y Beam size at | SOS Detector |

A Monte Carlo simulation perturbs the nominal design with randomly-selected values for the optical and mechanical errors for each optical element with an underlying assumption of Gaussian distribution. If one wishes, the probability function can be replaced with any common distribution (uniform, gamma . . . ) or a custom distribution. The output parameters of each perturbed case are evaluated and recorded. Histograms of each output parameters are plotted, and the mean and standard deviations can be readily calculated. A Monte Carlo simulation of 200 perturbed systems are generally enough to produce a good estimate of the statistics. From a series of Monte Carlo simulations on a particular ROS system without any alignments, output parameters that are out of specs are shown to be swath magnifications, spot sizes at P/R plane, and beam sizes (clear aperture) at Lens 2, Polygon, and Mirror 6 locations.

A minimum number of 5 adjustors are identified to bring the output parameters within the spec limits, given the magnitudes of the other element tolerances. The process is facilitated by the sensitivity analysis in CODE V. It provides a first-order estimation of the impact of each DOF (degree of freedom) for each optical component on the output parameters. They are further confirmed by Monte Carlo simulations. With the alignment of the 5 adjustors, all output parameters now have Cpk's above 1.33. The alignment procedure is given as follows.

Collimator axial translation for spot sizes,
VCSEL process-direction translation for reducing beam sizes at Lens 2 and Polygon by centering the beam at Mirror 2,
Mirror 2 beta tilt for reducing beam sizes at Mirror 6 by centering the beam at Mirror 4,
VCSEL gamma rotation for beam spacing uniformity, and
Lens 1 axial translation for swath magnifications.

One can further decrease the number of adjustors at the expense of tighter tolerances, i.e. higher cost. Using tolerance reduction strategy, eliminated ARE alignments for fast scan magnification and lead edge registration by reducing the top 10 contributors by 25% and 50%, respectively. However, decreasing the number of the current adjustors is proven to be difficult from the manufacturability and cost standpoint. For instance, a preliminary sensitivity analysis and Monte Carlo simulation shows that reducing the top 15 contributors on swath magnification to $\frac{1}{10}$th of their present values can only increase the swath magnification Cpk up to 1.01, leaving us with the other option, i.e., adjusting Lens 1. The tolerance types and values are shown in Table 5 below. Reducing the tolerance to such low values would be too difficult, if not impossible. One can reduce a larger set of tolerances to relieve the tight specs but higher cost associated with that needs to be added into considerations.

TABLE 5

Top 15 contributors to swath magnification

| Element | Tolerance Type | Original Value | Unit |
|---|---|---|---|
| L2 | Fringe | 2 | fr |
| L2 | Wedge | 0.0254 | mm |
| M3 | Cross-scan Translation | 0.27 | mm |
| M3 | Beta Tilt | 0.001745 | rad |
| L2 | Cross-scan Surface Decenter | 0.15 | mm |
| M6 | Fringe | 1 | mm |
| M1 | Fringe | 1 | fr |
| M1 | Z Translation | 0.05 | mm |
| L1 | Thickness | 0.1 | mm |
| L2 | X Translation | 0.05 | mm |
| M2 | Fringe | 1 | fr |
| M4 | X Translation | 0.1 | mm |
| L1 | Z Translation | 0.05 | mm |
| M4 | Beta Tilt | 0.001745 | rad |
| L2 | Z Translation | 0.05 | mm |

Described hereto is a VCSEL ROS system with a minimum number of adjustors. A total number of 5 adjustors are implemented to maintain the Cpk's of 65 output parameters above 1.33.

Some benefits associated with the disclosed process are keeping the number of adjustors at minimum means less cost on mechanical designing and tooling, and better efficiency in alignment process, while the system is still robust to the optical and mechanical errors.

FIG. 1 is a simplified elevational view of basic elements of an image printing system, showing a context of the present disclosure. Specifically, there is shown an "image-on-image" xerographic color printer, in which successive primary-color images are accumulated on an image bearing surface (e.g., photoreceptor belt), and the accumulated superimposed images are in one step directly transferred to an output sheet as a full-color image. It is appreciated that any image printing system, such as monochrome machines using any technology, machines which print on photosensitive substrates, xerographic machines with multiple photoreceptors, or ink-jet-based machines, can beneficially utilize the present disclosure as well.

Specifically, the FIG. 1 embodiment includes an image bearing surface 410 (e.g., belt photoreceptor), along which are disposed a series of stations, as is generally familiar in the art of xerography, one set for each primary color to be printed. For instance, to place a cyan color separation image on the image bearing surface 410, there is used a charge corotron 412C, an imaging laser 414C, and a development unit 416C. For successive color separations, there is provided equivalent elements 412M, 414M, 416M (for magenta), 412Y, 414Y, 416Y (for yellow), and 412K, 414K, 416K (for black). The successive color separations are built up in a superimposed manner on the surface of the image bearing surface 425, and then the combined full-color image is transferred at transfer station 420 to an output sheet. The output sheet is then run through a fuser 430, as is familiar in xerography. Printing process may be controlled, for example, by a print controller 410.

As is familiar in the art of "laser printing," by coordinating the modulation of the various lasers with the motion of the image bearing surface 425 and other hardware (such as rotating mirrors, etc., not shown), the lasers discharge areas on the image bearing surface 425 to create the desired printing, particularly after these areas are developed by their respective development units 416C, 416M, 416Y, 416K.

Figure 2:
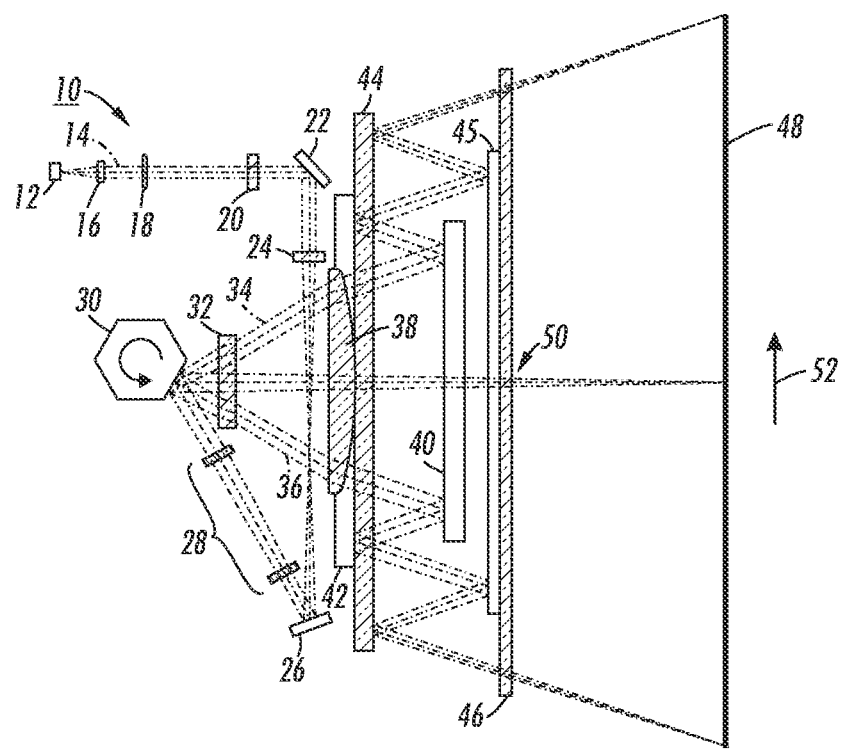
FIG. 2 shows an exemplary ROS and associated optical elements according to this disclosure.

FIG. 2 represents a top view of a multiple-beam laser scanner system according to the concepts of the present application. Initially, an independently addressable laser array 12, which includes a plurality of beam-generating elements, emits beams 14, defined as a group, to pass through a collimator lens 16, an aperture stop 18, and a first cylinder lens 20. Beams 14 impinge on a first fold mirror 22, causing beams 14 to move through a second cylinder lens 24 to a second fold mirror 26. Next, beams 14 passes through cylinder lens group 28, consisting of two separate cylinder lenses, and onto a facet of rotating polygon mirror 30. Rotation of the polygon mirror causes the beams 14 to be scanned through a range of angles and positions, including side scan positions 34 and 36 and center position 50. The scanned beams 14 pass through a first scan lens 32 and a second scan lens 38 and then bounce between cylinder mirrors 40, 42, 44 and fold mirror 45, and through a portion of output window 46, to a recording medium 48, which in one embodiment may be a photoreceptor or xerographic drum.

The beams 14 are scanned in scan direction 52, which is the "fast scan" direction. Beams 14 are reflected to impinge on and illuminate a plurality of contiguous facets of polygon mirror 30. The rotational axis of polygon mirror 30 is orthogonal to the plane in which light beams 14 travel. With rotation of the polygon mirror 30, beams are reflected from illuminated facets and turned through a scan angle for flying spot scanning. Alternatively, flying spot scanning could be provided by any other suitable device, such as a holographic scanner incorporating linear diffraction gratings. Beams 14 are modulated in conformance with information contained in a video signal input. The output intensity profile of each laser beam in the array is Gaussian or near-Gaussian. The beams 14 generate more than a single imaging spot on the recording medium, where the spots are generated in conformance with signal image information.

The details of FIG. 2 are intended to illustrate one embodiment of a multiple-beam laser scanner system which incorporates concepts of the present application. However, it is to be understood such concepts may also be used in multiple-beam scanner systems of other designs. Further, while the present concepts maybe applied to systems with as few as two beams, presently multiple-beam systems have been developed which include 31 or 32 beams, and the present concepts are applicable to these systems.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of adjusting a minimum number of five or more positional adjusters of a plurality of positional adjusters, each positional adjuster configured to adjust a position of a separate optical element of a plurality of respective minimum number of five or more optical elements associated with a printing system ROS (Raster Output Scanner) associated with a photoreceptor, the printing system ROS including a total number of optical elements greater than the minimum number of five or more optical elements arranged and aligned to sequentially pass a plurality of light beams transmitted from an independently addressable laser array sequentially through the total number of optical elements to the photoreceptor, the method comprising:

a) creating a computer model of the printing system ROS, the computer model including a plurality of input parameters associated with the optical and mechanical tolerances of the total number of optical elements associated with the printing system ROS effecting the performance of the plurality of light beams sequentially passing through the total number of optical elements, and a plurality of output parameters associated with the performance of the plurality of light beams sequentially passing through the total number of optical elements associated with the printing system ROS;
   b) performing a sensitivity analysis of the computer model to determine an effect of the plurality of input parameters on each respective output parameter;
   c) performing a Monte Carlo simulation of the printing system ROS using the computer model, the simulation determining the minimum number of the plurality of the positional adjusters and generating an associated alignment sequence of the minimum number of the plurality of positional adjusters required to adjust a plurality of positions associated with the respective minimum number of optical elements to achieve a targeted Cpk (process capability index) of the output parameters above a predetermined value, wherein the minimum number of optical elements is less than the total number of optical elements associated with the printing system ROS and the minimum number of the plurality of positional adjusters is equivalent to the minimum number of optical elements; and
   d) according to the alignment sequence generated in step c), aligning each of the minimum number of positional adjusters and respective minimum number of optical elements to configure the printing system ROS to transmit the plurality of light beams from the independently addressable laser array through the total number of optical elements to the photoreceptor to achieve the targeted Cpk.

2. The method according to claim 1, wherein step a) creates a computer model of the printing system ROS using CODE V.

3. The method according to claim 1, wherein the printing system includes 5 to 30 optical elements and a plurality of the optical elements each having six positional degrees of freedom.

4. The method according to claim 1, wherein the targeted Cpk (process capability index) is in the range of 1 to 5.

5. The method according to claim 1, wherein the optical elements include one or more of a laser diode, a collimator, a beam splitter, one or more lenses, one or more mirrors, an aperture and a polygon.

6. The method according to claim 1, wherein the optical elements are configured such that light coming out of a diode propagates through seven lenses and six mirrors before hitting the photoreceptor, and a spinning polygon reflects light beams to desired scan locations on the photoreceptor.

7. The method according to claim 1, wherein the output parameters include one or more of bow, registration, scan nonlinearity, wobble, beam spacing magnification, spot size, spot size uniformity associated with the printing system ROS.

8. The method according to claim 1, wherein the printing system ROS is a multibeam ROS.

9. The method according to claim 1, wherein the printing system ROS includes one adjuster per output parameter.

10. The method according to claim 1, wherein the input parameters include one or more positional degrees of freedom associated with each optical element and one or more constructional tolerances associated with each optical element.

11. A computer readable program product including a non-transitory computer-usable data carrier storing instructions that when executed by a computer, causes the computer to execute the instructions to perform a method of adjusting a minimum number of five or more of a plurality of positional adjusters to adjust positions of a plurality of respective minimum number of five or more optical elements associated with a printing system ROS (Raster Output Scanner) associated with a photoreceptor, the printing system ROS including a total number of optical elements greater than the minimum number of five or more optical elements arranged and aligned to sequentially pass a plurality of light beams transmitted from an independently addressable laser array sequentially through the total number of optical elements to the photoreceptor, the method comprising:

a) creating a computer model of the printing system ROS, the computer model including a plurality of input parameters associated with the optical and mechanical tolerances of the total number of optical elements associated with the printing system ROS effecting the performance of the plurality of light beams sequentially passing through the total number of optical elements, and a plurality of output parameters associated with the performance of the plurality of light beams sequentially passing through the total number of optical elements associated with the printing system ROS;

b) performing a sensitivity analysis of the computer model to determine an effect of the plurality of input parameters on each respective output parameter;

c) performing a Monte Carlo simulation of the printing system ROS using the computer model, the simulation determining the minimum number of the plurality of positional adjusters and generating an associated alignment sequence of the minimum number of the plurality of positional adjusters required to adjust a plurality of positions associated with the respective minimum number of optical elements to achieve a targeted Cpk (process capability index) of the output parameters above a predetermined value, wherein the minimum number of optical elements is less than the total number of optical elements associated with the printing system ROS and the minimum number of the plurality of positional adjusters is equivalent to the minimum number of optical elements; and d) according to the alignment sequence generated in step c), aligning the minimum number of positional adjusters and respective minimum number of optical elements to configure the printing system ROS to transmit the plurality of light beams from the independently addressable laser array through the total number of optical elements to the photoreceptor to achieve the targeted Cpk.

12. The computer program product according to claim 11, wherein step a) creates a computer model of the printing system ROS using CODE V.

13. The computer program product according to claim 11, wherein the optical elements include one or more of a laser diode, a collimator, a beam splitter, one or more lenses, one or more mirrors, an aperture and a polygon.

14. The computer program product according to claim 11, wherein the optical elements are configured such that light coming out of a diode propagates through seven lenses and six mirrors before hitting the photoreceptor, and a spinning polygon reflects light beams to desired scan locations on the photoreceptor.

15. The computer program product according to claim 11, wherein the output parameters include one or more of bow, registration, scan nonlinearity, wobble, beam spacing magnification, spot size, spot size uniformity associated with the printing system ROS.

16. The computer program product according to claim 11, wherein the printing system ROS is a multibeam ROS.

17. The computer program product according to claim 11, wherein the printing system ROS includes one adjuster per output parameter.

18. The computer program product according to claim 11, wherein the input parameters include one or more positional degrees of freedom associated with each optical element and one or more constructional tolerances associated with each optical element.

* * * * *